(12) United States Patent
Rule

(10) Patent No.: US 7,461,829 B2
(45) Date of Patent: Dec. 9, 2008

(54) VALVE FOR CONTROLLING SLURRY FLOW

(75) Inventor: Richard Rule, Centurion (ZA)

(73) Assignee: Outotec Ojy, Espoo (FI)

( * ) Notice: Subject to any disclaimer, the term of this patent is extended or adjusted under 35 U.S.C. 154(b) by 74 days.

(21) Appl. No.: 10/559,087

(22) PCT Filed: Jun. 3, 2004

(86) PCT No.: PCT/FI2004/000339

§ 371 (c)(1),
(2), (4) Date: Nov. 30, 2005

(87) PCT Pub. No.: WO2004/109170

PCT Pub. Date: Dec. 16, 2004

(65) Prior Publication Data

US 2006/0118753 A1 Jun. 8, 2006

(30) Foreign Application Priority Data

Jun. 6, 2003 (FI) ................................. 20030847

(51) Int. Cl.
*F16K 51/00* (2006.01)

(52) U.S. Cl. ...................... 251/318; 251/335.3; 251/359

(58) Field of Classification Search ... 251/335.1–335.3, 251/331, 359, 367, 318
See application file for complete search history.

(56) References Cited

U.S. PATENT DOCUMENTS

| | | | | |
|---|---|---|---|---|
| 600,249 A * | 3/1898 | Parsells | .................... | 251/335.3 |
| 701,615 A * | 6/1902 | Reichenbach | ............ | 251/335.3 |
| 1,859,834 A * | 5/1932 | May | .......................... | 251/335.3 |
| 2,308,183 A * | 1/1943 | Lewis et al. | ............... | 251/335.3 |
| 2,699,801 A * | 1/1955 | Schleyer | ................... | 251/335.2 |
| 2,932,203 A * | 4/1960 | Peters | ....................... | 251/335.3 |
| 3,084,901 A * | 4/1963 | Thorburn | ................... | 251/335.3 |
| 4,240,610 A * | 12/1980 | Trimble | ..................... | 251/335.3 |
| 4,711,270 A * | 12/1987 | Fornasari | ................. | 251/335.3 |
| 4,815,699 A * | 3/1989 | Mueller | ..................... | 251/335.3 |
| 5,197,712 A | 3/1993 | Engelhardt | | |
| 5,220,943 A * | 6/1993 | Zink | ........................ | 251/335.3 |
| 5,249,745 A * | 10/1993 | Bertolotti | ...................... | 251/57 |
| 5,271,602 A * | 12/1993 | Funaba | .................... | 251/335.3 |
| 5,345,857 A * | 9/1994 | Murphy | .................... | 251/335.3 |
| 5,560,586 A * | 10/1996 | Aruga et al. | .............. | 251/335.3 |
| 5,597,009 A * | 1/1997 | Scherrer et al. | ........... | 251/335.3 |
| 5,755,255 A * | 5/1998 | Iwabuchi | .................. | 251/335.3 |
| 5,887,853 A * | 3/1999 | Holmes et al. | ............ | 251/335.2 |
| 6,237,892 B1 * | 5/2001 | Ito | ................................ | 251/203 |
| 6,305,665 B1 * | 10/2001 | Coura et al. | .............. | 251/335.3 |
| 6,311,950 B1 * | 11/2001 | Kappel et al. | ............. | 251/335.3 |

FOREIGN PATENT DOCUMENTS

| | | |
|---|---|---|
| JP | 10220579 | 8/1998 |
| SU | 699269 | 11/1979 |
| WO | 93/25804 | 12/1993 |

* cited by examiner

*Primary Examiner*—John Bastianelli
(74) *Attorney, Agent, or Firm*—Smith-Hill and Bedell

(57) ABSTRACT

The invention relates to a seal to be used as a valve stem seal in a valve for controlling flows containing solid material such as slurry flows with an actuator. The seal is positioned outside of the valve body so that the inside of the seal and the valve body form an essentially closed space for the flow to be controlled.

10 Claims, 2 Drawing Sheets

VALVE FOR CONTROLLING SLURRY FLOW

Figure 1:
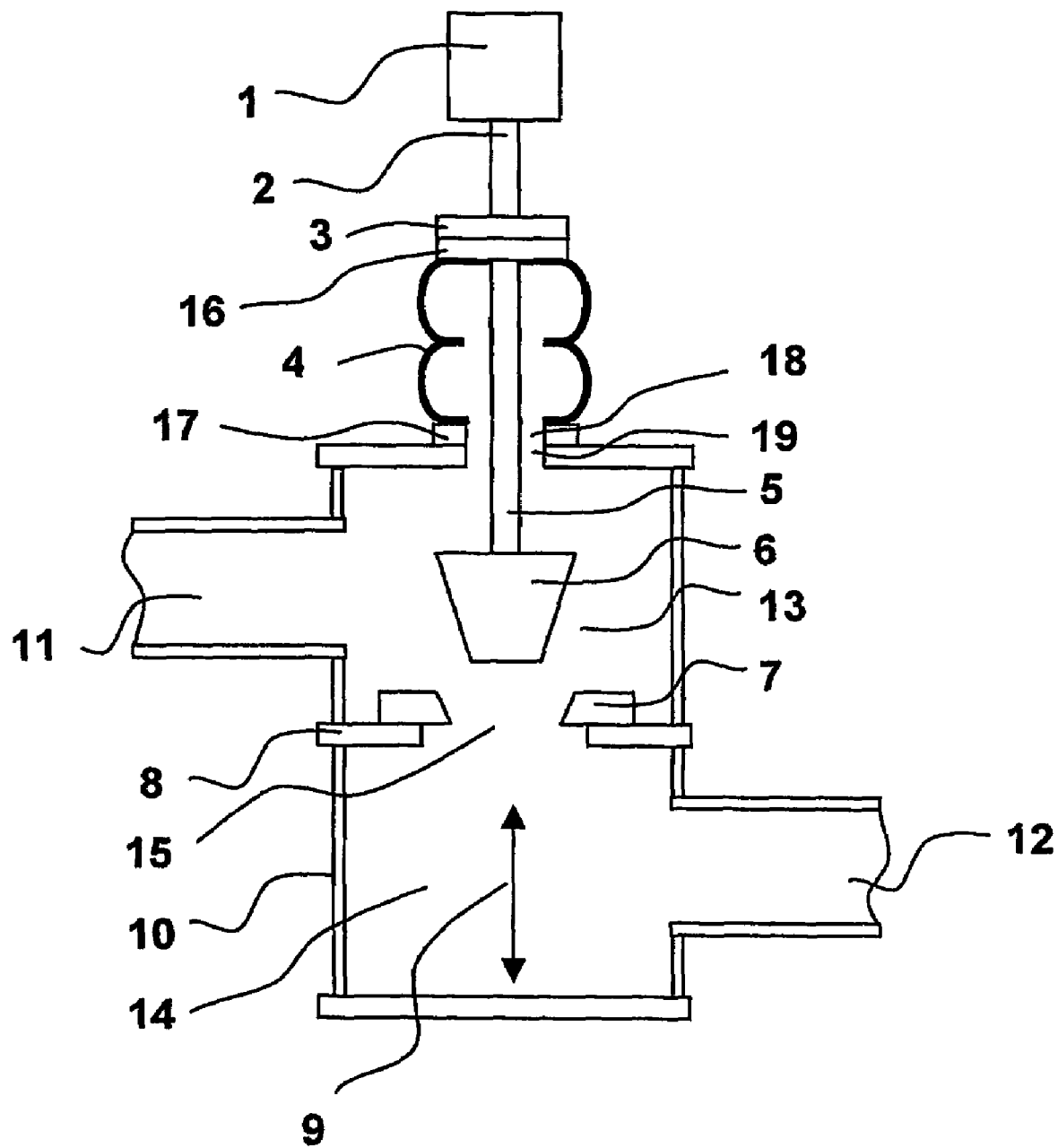

This is a national stage application filed under 35 USC 371 based on International Application No. PCT/FI2004/000339 filed Jun. 3, 2004, and claims priority under 35 USC 119 of Finnish Patent Application No. 20030847 filed Jun. 6, 2003.

This invention relates to a seal to be used as a valve stem seal in a valve for controlling flows containing solid material such as slurry flows.

There are various methods for achieving a seal between the valve stem and the valve body, while still allowing for linear movement of the valve stem. It is common practice to use a control valve to control slurry flow. The flow is controlled in all control valves by varying the orifice through which the slurry flows. One of the most common methods is to adjust the position of a valve plug in relation to the valve seat in order to vary the size of the orifice and thereby the flow through the control valve. The force required to move the valve plug is provided by an actuator, which is connected to the valve plug by means of the actuator rod and the valve stem.

The seal between the valve stem and the valve body is most commonly achieved by some sort of a sliding seal arrangement. Even though this arrangement is suitable for most liquids and gases it normally fails with slurry. If slurry penetrates the sliding seal, the solids within the slurry will result in abrasion of the seal which and eventually results failure of the seal and leakage of the process fluid or slurry out of the valve. Different kinds of arrangements for the seal between the valve stem and the valve body are described for instance in the U.S. Pat. No. 6,182,684 where a bellows is used to balance the sliding part of the seal. A bellows sealed rotary valve is also described in the U.S. Pat. No. 5,090,658.

The object of the invention is to eliminate some drawbacks of the prior art and to achieve an improved seal between the valve stem and the valve body so that the sliding arrangement is prevented.

The seal of the Invention is advantageously suitable for a valve arrangement, which is used for controlling flows containing solid material such as slurry flows. For the purposes of this description, slurry can be defined as a non-homogeneous liquid with a percentage of solids in suspension. The valve contains a valve body and a valve seat is positioned inside this valve body. The valve seat forms an orifice between two vessels inside the valve body so that slurry flow feeding into the valve body through an inlet comes into the first vessel in the moving direction of the slurry. The slurry flow from the valve body is discharged from the second vessel through an outlet. In order to control the amount of slurry flow discharging from the valve body the orifice between the vessels is provided with a valve plug. The valve plug is so shaped that when mounting into the orifice it is possible to stop the slurry flow from the first vessel into the second vessel.

For controlling the slurry flow between the vessels the valve plug is connected with an actuator, which is preferably installed outside the valve body. The valve body is provided with an opening for a valve stem, which is installed between a means, which is further connected with the actuator, and the valve plug. The opening for the valve stem is sized so that the valve stem can move freely in opening without having any contact with the valve body. The valve stem comes thus out of the valve body through the opening. The valve stem is in the other end opposite to the end having the valve plug attached in the means having a contact with the actuator and the valve stem is moved within the movement defined by the actuator. In accordance with the present invention the valve stem is sealed so that slurry is maintained inside the sealing arrangement.

According to the invention, the seal of the valve stem is attached in the valve body in one end and in another end in the means having a contact with the actuator. When attached in the valve body the seal is fixed around the opening wherethrough the valve stem is positioned so that it is created a clearance between the seal and the valve stem. The seal is attached in the means having the contact with the actuator so that the clearance between the seal and the valve stem is created essentially similar in width for the whole distance between the attaching points in the valve body and in the means having a contact with the actuator. Further, the seal of the invention is positioned outside of the valve body. The valve stem seal is preferably, but not limited to, being located on the top of the valve body. Depending on the operating circumstances the design may require that the valve stem seal is located on any other side of the valve body.

In the preferred embodiment of the invention, the valve plug is installed so that when the orifice between the two vessels of the valve body is fully closed the valve plug is in its lowest position in relation to the valve body and when the orifice between the two vessels is fully open the valve plug is in its highest position in relation to the valve body. When the valve stem is moved between the opening position and the closing position of the valve plug within the movement defined by the actuator the seal surrounding the valve stem is moved accordingly.

When operating the valve for controlling slurry flows and when the valve plug is at least partly in the opening position slurry will flow from the first vessel into the second vessel. During this flow the space formed between the seal and the valve stem can at least partly be filled by slurry because the valve stem has not any contact with the valve body. Because the valve stem is connected with the means having the contact to the actuator, the actuator itself is isolated from the slurry environment in order to protect the actuator.

The seal of the valve stem of the invention provides a reliable sealing in the process fluid from leaking out of a valve, while still allowing the valve stem free movement to operate. The seal in accordance with the invention is made flexible so that the seal is installed movable with the valve stem. Further required properties for the seal of the invention include, but are not limited to the following:

Flexibility to allow for the required valve plug movement between the closing position and the opening position.

Corrosion resistance to prevent corrosion from chemicals within the slurry and the external environment.

Resistance to operating pressure; this property is required for the valve seal to be able to contain the pressure of the slurry.

Abrasion resistance: This property is required for the seal and the valve stem to be able to resist the abrasion due to the slurry flow.

The materials considered for manufacture of the flexible slurry valve seal of the invention include, but are not limited to the following:

Rubber, natural or synthetic,

Plastics, such as polyurethane and high density polyethylene (HDPE),

Composite materials, such as rubber/polyurethane or fiber reinforced polyurethane or reinforced rubber composites, composites of different types of rubber, Metal, such as steel Any combination of the above materials is also possible.

The flexible slurry valve stem seal of the invention can be used with various control valves. The flexible slurry valve stem seal is designed primarily for slurry control valve applications, but the flexible slurry valve stem seal is not limited to slurry or control valve applications only.

Figure 2:
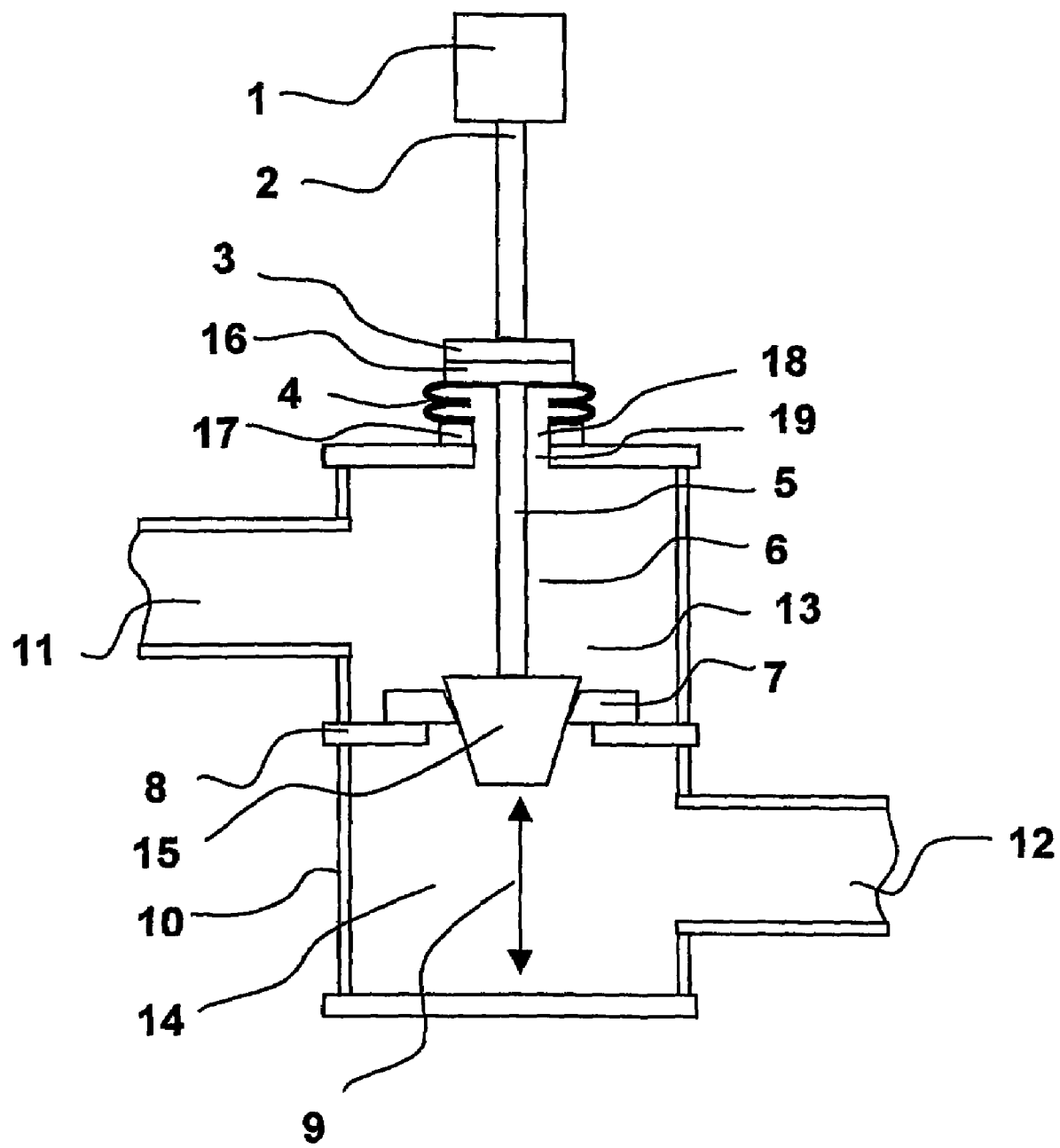

The invention is described in more details referring in the appended drawings wherein FIG. 1 illustrates one preferred embodiment of the invention as a partly cut side view, when the valve is in the opening position, and FIG. 2 illustrates the embodiment of FIG. 1 as a partly cut side view, when the valve is in the closing position.

In accordance with the FIGS. 1 and 2 a valve body 10 is provided with an inlet 11 for feeding slurry into the valve body 10 and an outlet 12 for discharging the slurry from the valve 10. The valve body 10 is also provided with a partition 8, which divides the inside of the valve body 10 into two vessels; a slurry feeding vessel 13 and a slurry discharging vessel 14. The partition 8 is further provided with an orifice 15 wherethrough slurry will flow from the vessel 13 to the vessel 14. In order to control the slurry flow the orifice 15 is provided with a valve seat 7 whereinto a valve plug 6 is plugged when the flow from the vessel 13 to the vessel 14 is stopped as illustrated in FIG. 2.

In order to control the movement of the valve plug 6 between the opening position in FIG. 1 and the closing position in FIG. 2 in the direction referred by 9 the valve body 10 is provided with an actuator 1 which has a connection with the valve plug 6. The actuator 1 is provided with an actuator rod 2, which is hydraulically, pneumatically or electrically connected with an actuator connecting flange 3. The actuator connecting flange 3 is attached to a bellows 4 operating as the valve stem seal by an end plate 16. The bellows 4 is in another end opposed to the actuator connecting flange 3 attached to the valve body 10 by an end plate 17 provided with an opening 18. The valve body 10 has an essentially similar opening 19 in shape with the opening 18 of the end plate 17. A valve stem 5 is attached between the end plate 16 of the valve stem seal 4 and the valve plug 6 so that the valve stem 5 is partly inside and partly outside of the valve body 10.

The valve stem 5 protrudes out of the valve stem seal 4 into the valve body 10 through the openings 18 and 19 in the end plate 17 of the valve stem seal 4 and in the valve body 10 respectively. In accordance with the invention the openings 18 and 19 are designed so that there is sufficient clearance between the valve stem 5 and the inside of the bellows 4 to allow for free movement of slurry to go through the openings 18 and 19. Therefore, the inside of the seal 4 and the valve body 10 form an essentially closed space for the flow to be controlled. The clearance between the valve stem 5 and the inside of the bellows 4 is critical to the operation of the seal. The clearance is designed to be large enough to prevent excessive abrasion of the inside of the bellows 4. At no place does the inside of the flexible slurry valve stem seal 4 come into contact with the valve stem 5.

In order to achieve slurry flow control, the actuator 1 will move the actuator connecting flange 3 and further the connected valve stem 5 in order to move the valve plug 6, essentially in a linear motion. The actuator connecting flange 3 with the end plate 16 of the valve stem seal 4 is free to move with the valve stem 5 and the seal 4 while the end plate 17 of the seal 4 is fixed in position with the valve body 10 and not free to move. The result of the movement of the valve stem 4 is that the bellows 4 operating as the seal will be compressed or extended.

The object of the bellows 4 is to maintain a seal between valve body 10 and the openings 18 and 19. The bellows seal 4 prevents slurry escaping from the valve arrangement as the valve stem 5 moves.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

The invention claimed is:

1. A valve for controlling flow of fluid containing solid material, comprising:
   a valve body defining a valve chamber and having an outer wall formed with an opening,
   a valve seat located within the valve chamber and defining an orifice,
   a valve plug located within the valve chamber and moveable relative co the valve seat for opening and closing the valve,
   a valve actuator located outside the valve body,
   a valve stem extending through said opening and coupling the valve actuator to the valve plug, and
   a flexible valve stem seal positioned outside the valve body and sealing the valve stem to the valve body, the valve stem seal defining a seal chamber that is in communication with the valve chamber, whereby the seal chamber and the valve chamber form an essentially closed space for the fluid,
   and wherein the opening formed in the outer wall of the valve body is of substantially greater cross-sectional area than the valve stem, whereby contact between the valve stem and the valve body is avoided, the valve body comprises an interior partition that is spaced from the outer wall and divides the valve chamber into first and second vessels, the first vessel is of substantially greater cross-sectional area perpendicular to the valve stem than the opening formed in the outer wall of the valve body, the valve body has an inlet that opens into one of said first and second vessels and an outlet that opens from the other of said first and second vessels, the outer wall bounds the first vessel, the valve seat is located in the first vessel and is attached to the interior partition, the valve plug is located in the first vessel and is moveable in the first vessel relative to the valve seat for opening and closing the valve, and the second vessel is of substantially greater cross-sectional area perpendicular to the valve stem than the orifice in the valve seat.

2. A valve according to claim 1, wherein the seal comprises a substantially cylindrical bellows secured at a first end to the outer wall of the valve body and at a second end to the valve stem, the bellows being extendable and compressible longitudinally of the valve stem, whereby the bellows accommodates movement of the valve plug relative to the valve seat for opening and closing the valve.

3. A valve according to claim 1, wherein the seal comprises a bellows.

4. A valve according to claim 1, wherein the seal is made of rubber.

5. A valve according to claim 1, wherein the seal is made of plastic.

6. A valve according to claim 1, wherein the seal is made of steel.

7. A valve according to claim 1, wherein the seal is made of a composite material.

8. A valve according to claim 1, wherein the seal comprises an end plate attached to the valve stem and a substantially cylindrical bellows attached at a first end to the end plate and at a second end to the outer wall of the valve body.

9. A valve according to claim 1, wherein the valve stem is elongate and has first and second opposite ends, the valve stem is aligned with an axis of the valve body, the actuator is connected to the valve stem at the first end thereof and effects movement of the valve stem along the axis of the valve body, and the valve plug is connected co the valve stem at the second end thereof and is moveable relative to the valve seat along the axis of the valve body for opening and closing the valve.

10. A valve according to claim 1, wherein the first vessel is of substantially greater cross-sectional area perpendicular to the valve stem than the orifice in the valve seat.

* * * * *